US008108921B2

(12) United States Patent
Shin et al.

(10) Patent No.: US 8,108,921 B2
(45) Date of Patent: Jan. 31, 2012

(54) SINGLE-SIGN-ON METHOD BASED ON MARKUP LANGUAGE AND SYSTEM USING THE METHOD

(75) Inventors: Dong-kyoo Shin, Seoul (KR); Dong-il Shin, Seoul (KR); Jong-il Jeong, Seongnam-si (KR)

(73) Assignees: Samsung Electronics Co., Ltd., Suwon-si (KR); Industry-Academia Cooperation Group of Sejong University, Seoul (KR)

( * ) Notice: Subject to any disclaimer, the term of this patent is extended or adjusted under 35 U.S.C. 154(b) by 1537 days.

(21) Appl. No.: 11/149,150

(22) Filed: Jun. 10, 2005

(65) Prior Publication Data

US 2005/0277420 A1    Dec. 15, 2005

(30) Foreign Application Priority Data

Jun. 10, 2004    (KR) .................. 10-2004-0042538

(51) Int. Cl.
*H04L 29/06*    (2006.01)
*G06F 7/04*    (2006.01)
*G06F 15/16*    (2006.01)
*G06F 17/30*    (2006.01)

(52) U.S. Cl. ............................................. 726/8; 726/30
(58) Field of Classification Search .................. 726/8, 30
See application file for complete search history.

(56) References Cited

U.S. PATENT DOCUMENTS

| 7,188,360 | B2 * | 3/2007 | Gerdes et al. ..................... 726/4 |
| 7,219,154 | B2 * | 5/2007 | Blakley et al. ................ 709/229 |
| 7,221,935 | B2 * | 5/2007 | Barriga-Caceres et al. ........................ 455/414.1 |
| 7,290,278 | B2 * | 10/2007 | Cahill et al. ....................... 726/6 |
| 7,444,666 | B2 * | 10/2008 | Edwards et al. ................... 726/1 |
| 7,603,555 | B2 * | 10/2009 | Schmidt et al. ............... 713/168 |
| 7,698,398 | B1 * | 4/2010 | Lai ................. 709/223 |
| 7,747,856 | B2 * | 6/2010 | Favazza et al. ............... 713/168 |
| 7,788,711 | B1 * | 8/2010 | Sun et al. .......................... 726/8 |
| 7,831,693 | B2 * | 11/2010 | Lai ............... 709/220 |
| 2001/0028636 | A1 | 10/2001 | Skog et al. |
| 2002/0157023 | A1 * | 10/2002 | Callahan et al. .............. 713/201 |
| 2003/0023880 | A1 * | 1/2003 | Edwards et al. .............. 713/201 |

(Continued)

FOREIGN PATENT DOCUMENTS

KR    2002-0020144 A    3/2002

(Continued)

OTHER PUBLICATIONS

Gross, Security analysis of the SAML single sign-on browser/artifact profile, 2003.*

(Continued)

*Primary Examiner* — David Garcia Cervetti
(74) *Attorney, Agent, or Firm* — Sughrue Mion, PLLC

(57) ABSTRACT

A single-sign-on method in a wired/wireless hybrid environment and a system using the method are provided. The single-sign-on method includes: requesting user authentication by transmitting information required for authentication of a user using wireless Internet to an authentication message generator; generating authentication domain location information including location information of a current domain and information required for processing a user authentication message and transmitting the generated authentication domain location information to the user; and if an authentication message of a markup language format is received from the authentication message generator, analyzing the user authentication message and permitting or rejecting access of the user to resources.

42 Claims, 12 Drawing Sheets

U.S. PATENT DOCUMENTS

| | | |
|---|---|---|
| 2003/0061512 A1* | 3/2003 | Flurry et al. .................. 713/201 |
| 2003/0101246 A1 | 5/2003 | Lahti |
| 2003/0135588 A1 | 7/2003 | Bouthors |
| 2003/0149781 A1* | 8/2003 | Yared et al. .................. 709/229 |
| 2003/0163733 A1* | 8/2003 | Barriga-Caceres et al. .. 713/201 |
| 2003/0177121 A1* | 9/2003 | Moona et al. ..................... 707/9 |
| 2003/0177388 A1* | 9/2003 | Botz et al. ..................... 713/201 |
| 2003/0217288 A1 | 11/2003 | Guo et al. |
| 2004/0054898 A1* | 3/2004 | Chao et al. .................... 713/168 |
| 2004/0128378 A1* | 7/2004 | Blakley et al. ................ 709/224 |
| 2004/0128383 A1* | 7/2004 | Hinton .......................... 709/225 |
| 2004/0128390 A1* | 7/2004 | Blakley et al. ................ 709/228 |
| 2004/0128392 A1* | 7/2004 | Blakley et al. ................ 709/229 |
| 2004/0128393 A1* | 7/2004 | Blakley et al. ................ 709/229 |
| 2004/0128506 A1* | 7/2004 | Blakley et al. ................ 713/170 |
| 2004/0128541 A1* | 7/2004 | Blakley et al. ................ 713/201 |
| 2004/0128542 A1* | 7/2004 | Blakley et al. ................ 713/201 |
| 2004/0128544 A1* | 7/2004 | Hondo et al. .................. 713/201 |
| 2004/0128546 A1* | 7/2004 | Blakley et al. ................ 713/201 |
| 2004/0139319 A1* | 7/2004 | Favazza et al. ............... 713/168 |
| 2005/0021957 A1* | 1/2005 | Gu ................................. 713/170 |
| 2005/0076248 A1* | 4/2005 | Cahill et al. .................. 713/202 |
| 2005/0154913 A1* | 7/2005 | Barriga et al. ................ 713/201 |
| 2005/0223413 A1* | 10/2005 | Duggan et al. ..................... 726/3 |
| 2005/0278547 A1* | 12/2005 | Hyndman et al. ............ 713/185 |
| 2007/0184819 A1* | 8/2007 | Barriga-Caceres et al. .. 455/411 |
| 2007/0289004 A1* | 12/2007 | Chao et al. ......................... 726/9 |
| 2008/0046349 A1* | 2/2008 | Elberg et al. ..................... 705/35 |
| 2008/0072301 A1* | 3/2008 | Chia et al. ......................... 726/8 |
| 2008/0086564 A1* | 4/2008 | Putman et al. ................ 709/227 |
| 2009/0259753 A1* | 10/2009 | Hinton et al. ................. 709/226 |
| 2009/0265554 A1* | 10/2009 | Robles et al. ................. 713/168 |

FOREIGN PATENT DOCUMENTS

KR      2003-0040601 A      5/2003

OTHER PUBLICATIONS eGov, SAML Artifact profile as an adopted scheme for eauthentication, Nov. 2003.* eGov, E-Authentication interface specifications for the SAML artifact profile, Nov. 2003.*

* cited by examiner

FIG. 9

```
<element name="Assertion" type="saml:AssertionType"/>
<complexType name="AssertionType">
    <sequence>
        <element ref="saml:Conditions" minOccurs="0"/>
        <element ref="saml:Advice" minOccurs="0"/>
    </sequence>
    <choice maxOccurs="unbounded">
        <element ref="saml:Statement"/>
        <element ref="saml:SubjectStatement"/>
        <element ref="saml:AuthenticationStatement"/>
        <element ref="saml:AuthorizationDecisionStatement"/>
        <element ref="saml:AttributeStatement"/>
    </choice>
    <element ref="ds:Signature" minOccurs="0"/>
    </sequence>
    <attribute name="MajorVersion" type="integer" use="required"/>
    <attribute name="MinorVersion" type="integer" use="required"/>
    <attribute name="AssertionID" type="saml:IDType" use="required"/>
    <attribute name="Issuer" type="string" use="required"/>
    <attribute name="IssueInstant" type="dateTime" use="required"/>
  </complexContent>
</complexType>
```

FIG. 10

```
<saml:Assertion AssertionID="00cda300-0de-8521-83c5-c2d9f6847b91"
            IssuerInstant="2004-04-07T14:12:01Z"
            Issuer="gce.sejong.ac.kr"
            MajorVersion="1" MinorVersion="0"/>
    <saml:Conditions NotBefore="2004-04-07T14:12:01Z"/>
            NotOnOrAfter="2004-04-07T18:12:01Z"/>
    <saml:AuthenticationStatement
            AuthenticationMethod="password"
            AuthenticationInstant="2004-04-07T14:12:01Z">
        <saml:Subject>
            <saml:NameIdentifier NameQualifier="gce.sejong.ac.kr">
                JongilJeong
            </saml:NameIdentifier>
        </saml:Subject>
    </saml:AuthenticationStatement>
</saml:Assertion>
```

SINGLE-SIGN-ON METHOD BASED ON MARKUP LANGUAGE AND SYSTEM USING THE METHOD

CROSS-REFERENCE TO RELATED PATENT APPLICATION

This application claims priority from Korean Patent Application No. 10-2004-0042538, filed on Jun. 10, 2004, in the Korean Intellectual Property Office, the disclosure of which is incorporated herein in its entirety by reference.

BACKGROUND OF THE INVENTION

1. Field of the Invention

Methods and systems consistent with the present invention relate to a single-sign-on method for a wired/wireless hybrid environment and a system using the method.

2. Description of the Related Art

Mobile information services are carried out by mobile operators, contents providers, billing agencies, and service providers. However, in actuality, it is very difficult to distinguish those services and a single communication company, e.g., SK Telecom in Korea, may operate as a mobile operator, a service provider, and a contents provider at the same time.

A mobile device enables the use of a web service regardless of locations of a user and a web service provider. When adapting systems from a wired Internet environment to a mobile environment, it is preferable that development of a framework is extended to include issues such as performance, cost, and temporary usage failure. However, performance limitations of the mobile device hinder the efforts for adapting web services such as a single-sign-on method to a wired/wireless hybrid environment. When a web service environment is adapted to the wired/wireless hybrid environment, an access method should be considered as follows. In order for the user to access a specific service among a great number of services provided in a distributed environment of the web service, a consistent and singular access method should be provided. In the wired Internet environment, a single-sign-on mechanism is being studied to provide a consistent and singular access method.

The single-sign-on method is more important in the wired/wireless hybrid environment than in the wired Internet environment due to the performance limitations of mobile devices. For example, when a user authenticated by one site moves to another site, inputting a user name and a password through a keyboard is much easier than inputting them through a cell phone. In this manner, realization of the single-sign-on method in the wired/wireless hybrid environment is very important in the growing wireless Internet market. Wireless Internet internetworking contents are disclosed in Korean Patent Publication No. 2003-0040601. Authentication, usage right authorization, and billing are mainly disclosed with respect to mobile communication companies, but compatibility issues with other single-sign-on systems are not addressed in this publication. Accordingly, a single-sign-on method compatible with different systems in the wired/wireless hybrid environment is needed.

SUMMARY OF THE INVENTION

The present invention provides a single-sign-on method for a wired/wireless hybrid environment and a system using the method.

The present invention also provides a single-sign-on method which has excellent compatibility with other single-sign-on systems, and a system using the method.

According to an aspect of the present invention, there is provided a single-sign-on method based on a markup language, the method comprising: requesting user authentication by transmitting information required for authentication of a user using the wireless Internet to an authentication message generator; generating authentication domain location information (e.g., a security assertion markup language (SAML) artifact) including location information of a current domain and information required for processing a user authentication message and transmitting the generated authentication domain location information to the user; and if an authentication message of a markup language format (e.g., an SAML assertion) is received from the authentication message generator, analyzing the user authentication message and permitting or rejecting access of the user to resources.

According to another aspect of the present invention, there is provided a single-sign-on method based on a markup language, the method comprising: transmitting information required for user authentication in order to access service resources of a first domain providing a wired Internet service through the wireless Internet; receiving authentication domain location information including location information of the first domain and information required for processing a user authentication message; and receiving the authentication domain location information, analyzing the user authentication message, and taking permission or rejection of access to service resources of the first domain.

According to another aspect of the present invention, there is provided a single-sign-on method based on a markup language, the method comprising: receiving authentication domain location information including location information of a domain, which has authenticated a user using the wireless Internet; requesting authentication information of the user by transmitting the received authentication domain location information to the domain, which has authenticated the user; and if an authentication message of a markup language format is received from the domain, which has authenticated the user, analyzing the user authentication message and permitting or rejecting access of the user to resources.

According to another aspect of the present invention, there is provided a single-sign-on system based on a markup language, the system comprising: a plurality of domains providing service resources to a user using the wireless Internet through a gateway performing wired/wireless protocol transformation; and an authentication message generator receiving information required for user authentication from one domain A of the plurality of domains, authenticating the user, generating an authentication message of a markup language format, and transmitting the generated authentication message to the domain A, wherein the domain A, which has received the authentication message, permits or rejects access of the user to service resources by analyzing the user authentication message, generates authentication domain location information including its own location information and information required for processing the user authentication message, transmits the generated authentication domain location information to the user, and transmits the authentication message to another domain B of the plurality of domains if a request for authentication information of the user is received from the other domain B.

BRIEF DESCRIPTION OF THE DRAWINGS

The above and other aspects of the present invention will become more apparent by describing in detail exemplary embodiments thereof with reference to the attached drawings in which:

FIG. 9 illustrates an assertion schema in an SAML;

FIG. 10 illustrates an assertion including an authentication message according to an exemplary embodiment of the present invention;

DETAILED DESCRIPTION OF EXEMPLARY EMBODIMENTS OF THE INVENTION

Hereinafter, exemplary embodiments of the present invention will now be described in detail with reference to the accompanying drawings. In the description below, the term single-sign-on indicates that after a wireless Internet user provides information required for authentication and receives the authentication from a first domain in a wired Internet network, the user can access services of a second domain without providing separate information required for authentication.

Figure 1:
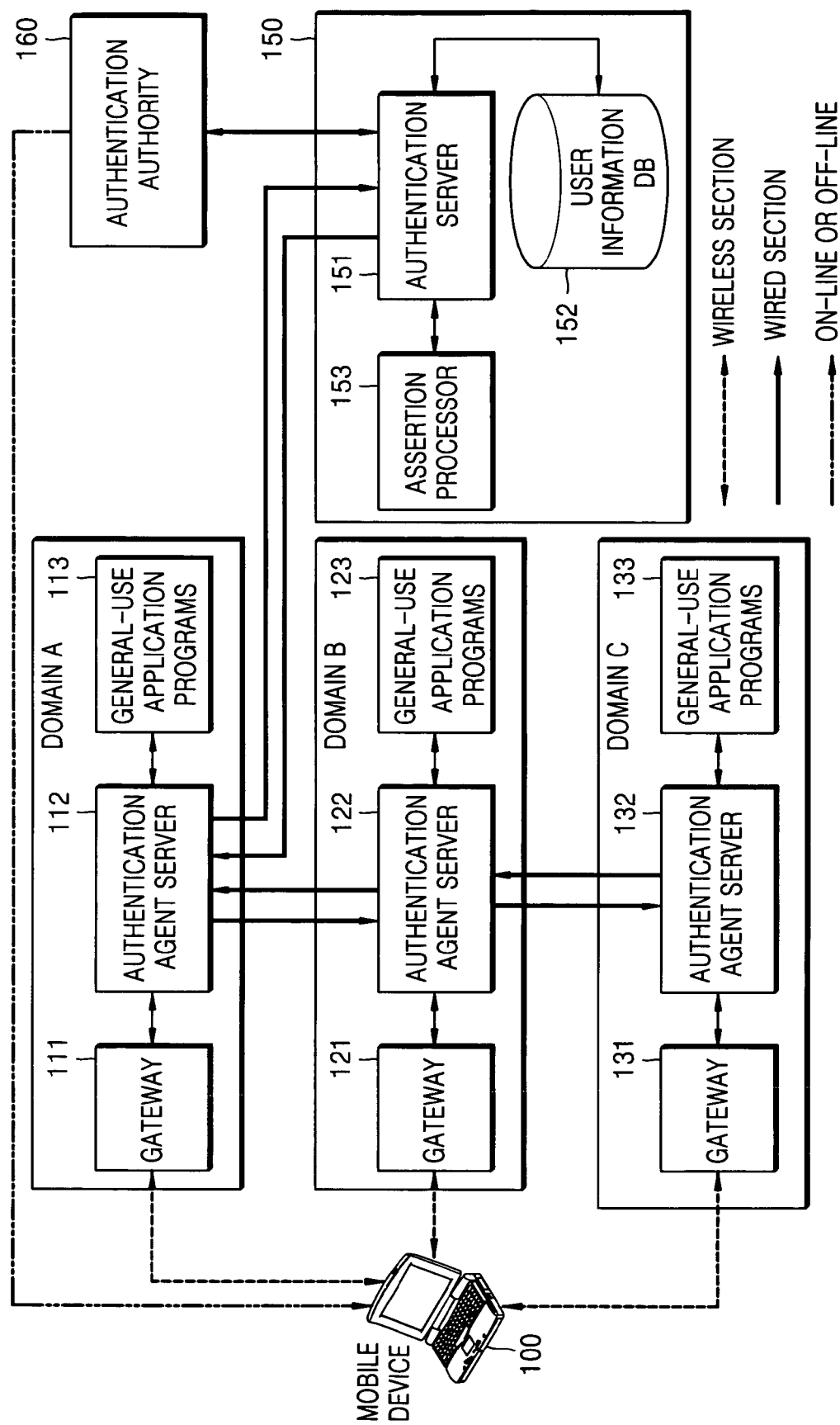
FIG. 1 illustrates an architecture of a single-sign-on system according to an exemplary embodiment of the present invention.

FIG. 1 illustrates an architecture of a single-sign-on system according to an exemplary embodiment of the present invention.

Referring to FIG. 1, a mobile device 100 intends to access services provided by domains of the wired Internet through wireless Internet (not shown). For convenience of description, it is assumed that the mobile device 100 accesses the services provided by the domains in the order of a domain A, a domain B, and a domain C.

Each domain includes a gateway between the wired Internet and the wireless Internet, an authentication agent server authenticating a device intending to access, and general-use application programs, e.g., a web service server providing a web service and a database storing necessary information to be provided to the web service. That is, the domain A includes a gateway 111, an authentication agent server 112, and general-use application programs 113. The domain B includes a gateway 121, an authentication agent server 122, and general-use application programs 123. The domain C includes a gateway 131, an authentication agent server 132, and general-use application programs 133.

In order to use a service provided by the domain A, a user inputs information required for authentication into the mobile device 100. For example, the user inputs a user name and a password. The information required for authentication is transmitted to the gateway 111 via the wireless Internet. The gateway 111 transmits the information required for authentication to the authentication agent server 112 via the wired Internet.

The authentication agent server 112 requests a reliable authentication message generator 150 for user authentication. The authentication message generator 150 generates an assertion by itself or generates the assertion by obtaining information required for generating an authentication message from an external information provider. The external information provider may be a user information database or an external public key infrastructure (PKI) service, and the authentication message generator itself can generate the information required for generating the authentication message. The authentication message generator 150 includes an authentication server 151 performing an authentication function, a user information database (DB) 152 storing user attributes, and an assertion processor 153 processing the assertion from the information required for generating the authentication message, which is provided from the outside. The authentication server 151 authenticates the user and transmits the authentication message to the authentication agent server 112. The authentication server 151 can transmit user attribute values stored in the user information DB 152 to the authentication agent server 112 by encapsulating them in the authentication message and transmit the assertion input from the outside via the assertion processor 153 to the authentication agent server 112. The user attribute values may be a user occupation, an age, and a gender. If the authentication is successfully finished, the user can access various services provided by the domain A using the mobile device 100.

Here, the assertion plays a role for transmitting information on an authentication activity previously performed by a subject (e.g., the user or a system), an attribute of the subject, and whether the user is allowed to access specific resources. The assertion is obtained by representing the information in a markup language format (e.g., an extensible markup language (XML)). Examples of the assertion are shown in FIGS. 9 and 10.

For the PKI service providing the information required for the authentication, the authentication server 151 receives information required for authenticating the mobile device 100 from an authentication authority 160. In more detail, the mobile device 100 receives a certificate from the authentication authority 160 in advance. The mobile device 100 transmits the certificate to the domain A when obtaining the authentication from the domain A. In this case, the certificate corresponds to the information required for the authentication. The certificate is transmitted to the authentication message generator 150 via the authentication agent server 112 of the domain A. The authentication server 151 checks the certificate using the authentication authority 160 and confirms a state of the certificate. In this case, the certificate state confirmation according to the certificate check corresponds to the information required for generating the authentication message. A wireless PKI (WPKI) is one authentication method of the mobile device 100 using the external authentication authority 160.

In a WKPI model, a wireless X.509 certificate or a wireless transport layer security (WTLS) certificate is basically used. The mobile device 100 can receive the certificate directly or location information of the certificate, e.g., a uniform resource locator (URL) from the authentication authority 160. For the latter, the mobile device 100 transmits the URL to the domain A for the authentication. Besides, since it is not easy for the mobile device 100 to generates a key using a Rivest-Shamir-Adleman (RSA) algorithm as a feature of the WKPI model, the mobile device 100 generates the key using an elliptic curve digital signature algorithm (ECDSA), and certificate verification is performed by a short lived certificate (SLC) method instead of a certificate revoke list (CRL).

When the user accesses the domain B instead of the domain A, the mobile device 100 receives authentication domain location information, e.g., an SAML artifact, from the authentication agent server 112 and transmits the authentication domain location information to the authentication agent server 122 of the domain B. Here, the information required for the authentication does not have to be separately provided to the domain B. Instead, the domain B authenticates the mobile device 100 by receiving an authentication message, e.g., an authentication assertion, from the domain A. That is, the authentication agent server 122 requests the authentication agent server 112 for authentication information of the mobile device 100 intending to access via the gateway 121 based on the authentication domain location information received form the mobile device 100. In an exemplary embodiment of the present invention, the authentication domain location information has an expiration date, and if the authentication domain location information is not transmitted from the domain B to the domain A within a given time, it is not available. Accordingly, this feature operates as a way for preventing the authentication domain location information from being stolen. The authentication agent server 112 of the domain A, which has received the authentication information request, determines integrity of the authentication domain location information, and if the authentication domain location information is neither counterfeited nor altered, the authentication agent server 112 transmits its possessed authentication message to the authentication agent server 122 of the domain B and delete the possessed authentication message and authentication domain location information. The authentication agent server 122 of the domain B newly generates authentication domain location information and analyzes the received authentication message, and if it is verified that the user is an authorized user as the analysis result, the user authentication can be replaced by the authentication message.

Also, when the user accesses the domain C instead of the domain B, the information required for the authentication does not have to be separately transmitted from the mobile device 100 to the domain C. Instead, domain C authenticates the mobile device 100 by receiving an authentication message from the domain B. That is, the authentication agent server 132 requests authentication information of the mobile device 100 intending to access via the gateway 131 from the authentication agent server 122 of the domain B. The authentication agent server 122 of the domain B, which has received the authentication information request, transmits an authentication message to the authentication agent server 132 of the domain C. The authentication agent server 132 of the domain C can replace the user authentication by the received authentication message.

Unlike the exemplary embodiment described above, a single-sign-on method can be used in which the authentication message is not directly transmitted to the domain B and the domain C and only information that the user is an authorized user is transmitted instead. In this case, the domain A transmits the information that the user is an authorized user to the domain B in response to the authentication information request of the domain B, and the domain C requests the domain A instead of the domain B for the authentication information. The domain A transmits the information that the user is an authorized user to the domain C in response to the authentication information request of the domain C.

In the exemplary embodiment described above, the gateway, the authentication agent server, and the general-use application programs of each domain can be physically constituted by separate servers and be logical constitution units existing in one server. The authentication message generator can be a third authority separate from each domain providing various services and be included in one of the domains A, B, and C. For example, the authentication agent server 112 of the domain A can operate as the authentication message generator for the domains A, B, and C.

The information required for the authentication can be input the user via the mobile device 100 and realized to be automatically transmitted, and there may be a case where it does not matter even if the authentication information is not transmitted. For example, in a case where the mobile device 100 is a cell phone and the domain A is a domain of a mobile communication company to which the cell phone has subscribed, the mobile device 100 intending to access the domain A does not have to transmit separate information required for authentication to the domain A, and the domain A can authenticate the mobile device 100 with only an identifier granted to the accessed mobile device 100, e.g., a telephone number.

Figure 2:
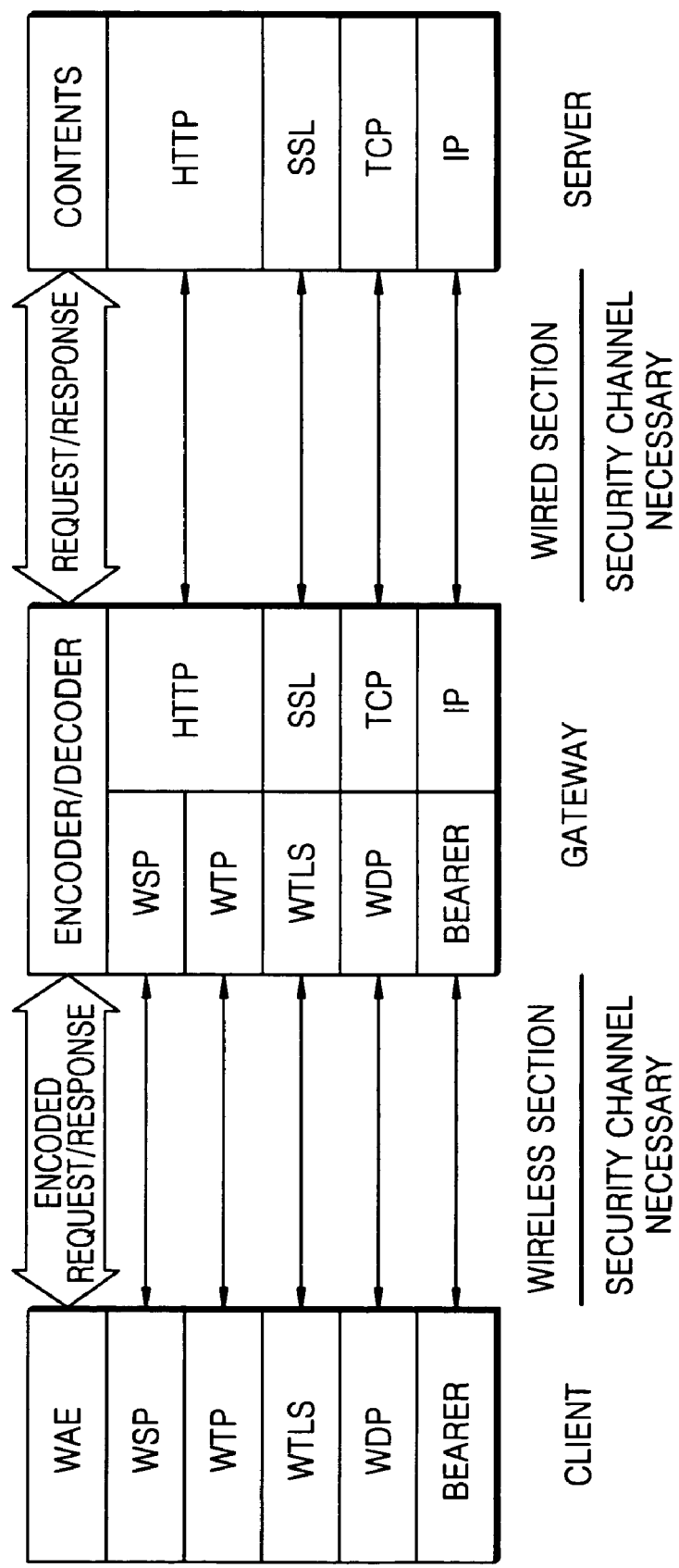
FIG. 2 illustrates a stack structure of a gateway according to an exemplary embodiment of the present invention.

FIG. 2 illustrates a stack structure of a gateway according to an exemplary embodiment of the present invention.

The gateway transforms wireless Internet data to wired Internet data, transmits the transformed wired Internet data to the wired Internet, transforms wired Internet data to wireless Internet data, and transmits the transformed wireless Internet data to the wireless Internet. A representative wired/wireless protocol transformation method is a wireless application protocol (WAP) method. The WAP is a standard of communication protocols for standardizing a method, which wireless devices, such as cell phones and wireless pagers, uses for Internet access such as electronic mails, web, news groups, and Internet relay chat (IRC). In the past, the Internet access with a mobile device was possible. However, interoperability between different systems was not guaranteed due to use of different technologies by manufactures. The WAP forum was established by a plurality of companies, such as Ericsson, Motorola, and Nokia, in order to solve this problem, performing standardization works for compatibility and interoperability between wireless Internet systems and wired Internet systems. In exemplary embodiments of the present invention, the WAP is used as a wired/wireless protocol transformation method for compatibility and interoperability.

A WAP layer includes: a wireless application environment (WAE); a wireless session protocol (WSP); a wireless transaction protocol (WTP); a wireless transport layer security (WTLS); and a wireless datagram protocol (WDP).

The WAE provides interoperations between wireless devices including a WAP/web application and a WAP microbrowser. The WSP provides HTTP/1.1 functionality and is synthesized with new characteristics such as suspend/resume of a long-lived session. The WTP is defined as a light weight transaction oriented protocol fit to light clients (mobile stations) and effectively operates for wireless datagram networks. The WTLS is a layer designed to provide privacy, data integrity, and authentication between two communication applications. The WDP, which is a general datagram service, provides a consistent service to an upper layer protocol and transparently communicates with one of available lower layer services.

The gateway relays between a client in which the WAP micro-browser is installed and a server providing contents. Each of a relayed wireless section and a relayed wired section needs a security channel. The WTLS is in charge of the security channel in a wireless channel section, and a secure socket layer (SSL) is in charge of the security channel in a wired channel section. The mobile device 100 of FIG. 1 corresponds to the client of FIG. 2, and the authentication agent servers and web service servers of FIG. 1 correspond to the server of FIG. 2. The use of the WAP as a gateway scheme for relaying wired/wireless data has been described. However, this is only an example, and a DoCoMo scheme of NTT Co. in Japan or a Mobile Explorer of Microsoft Co. in USA can be used.

Figure 3:
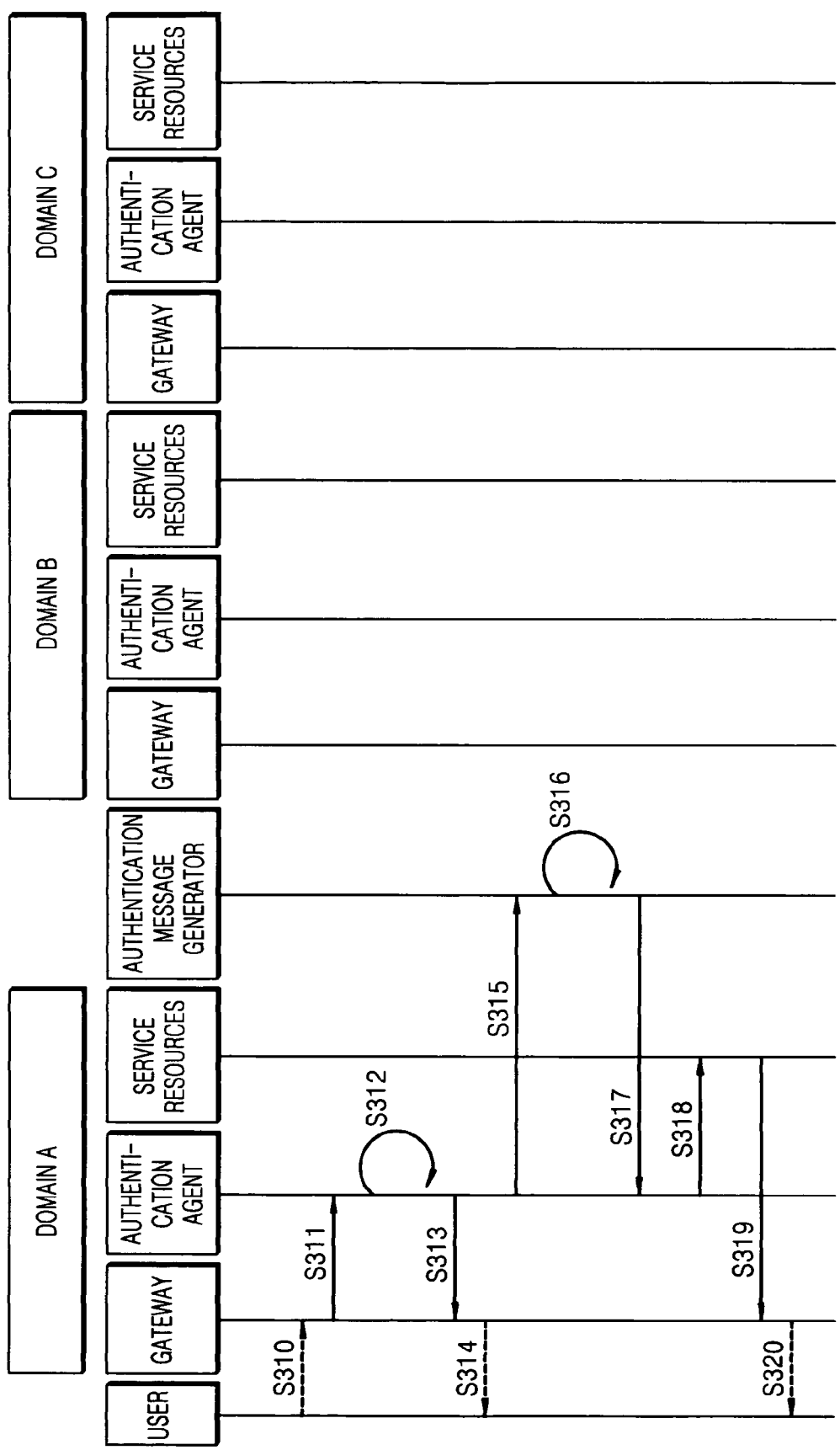
FIGS. 3 through 5 are sequence diagrams illustrating operations of the single-sign-on system according to a first exemplary embodiment of the present invention.
Figure 4:
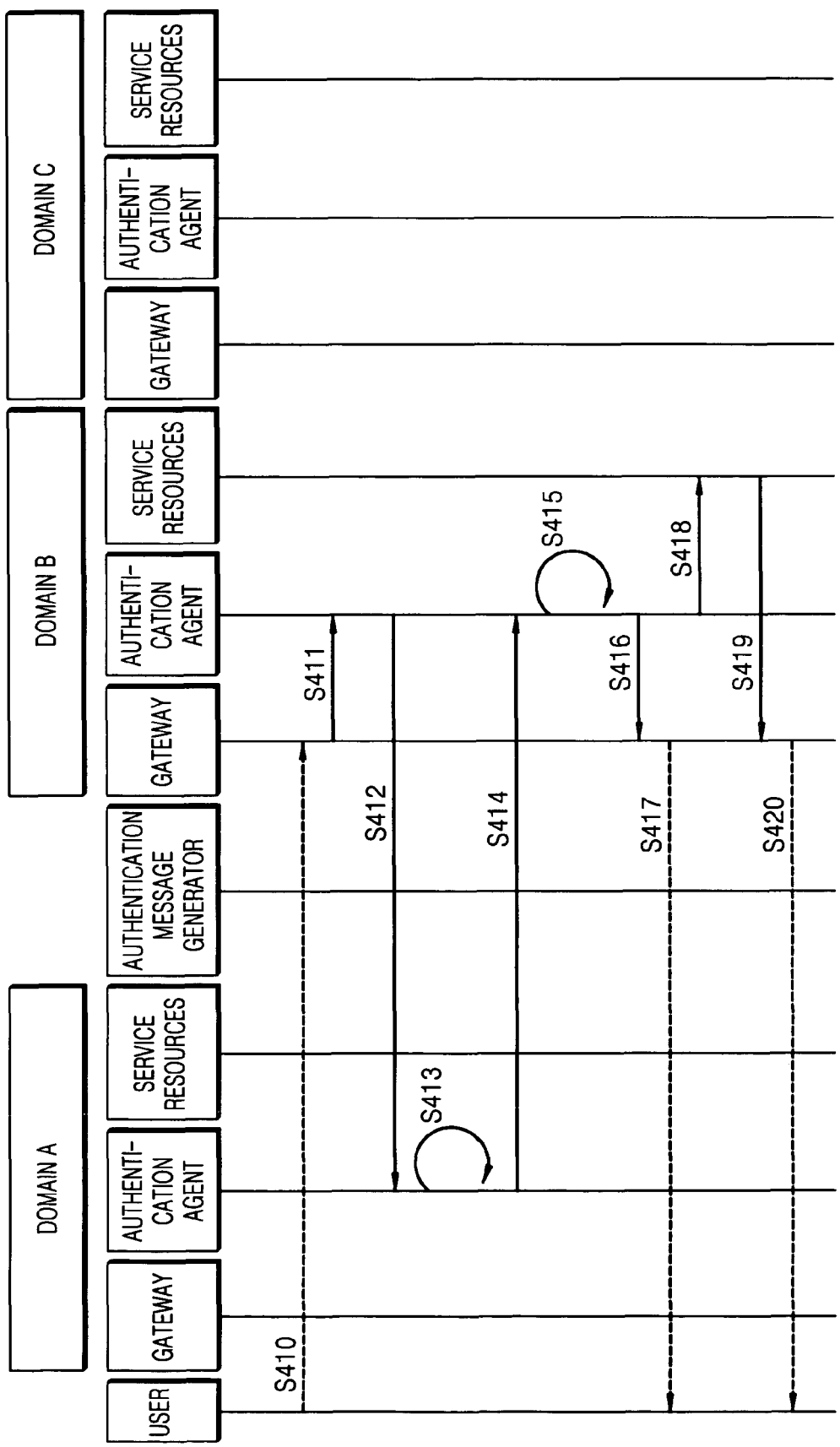
Figure 5:
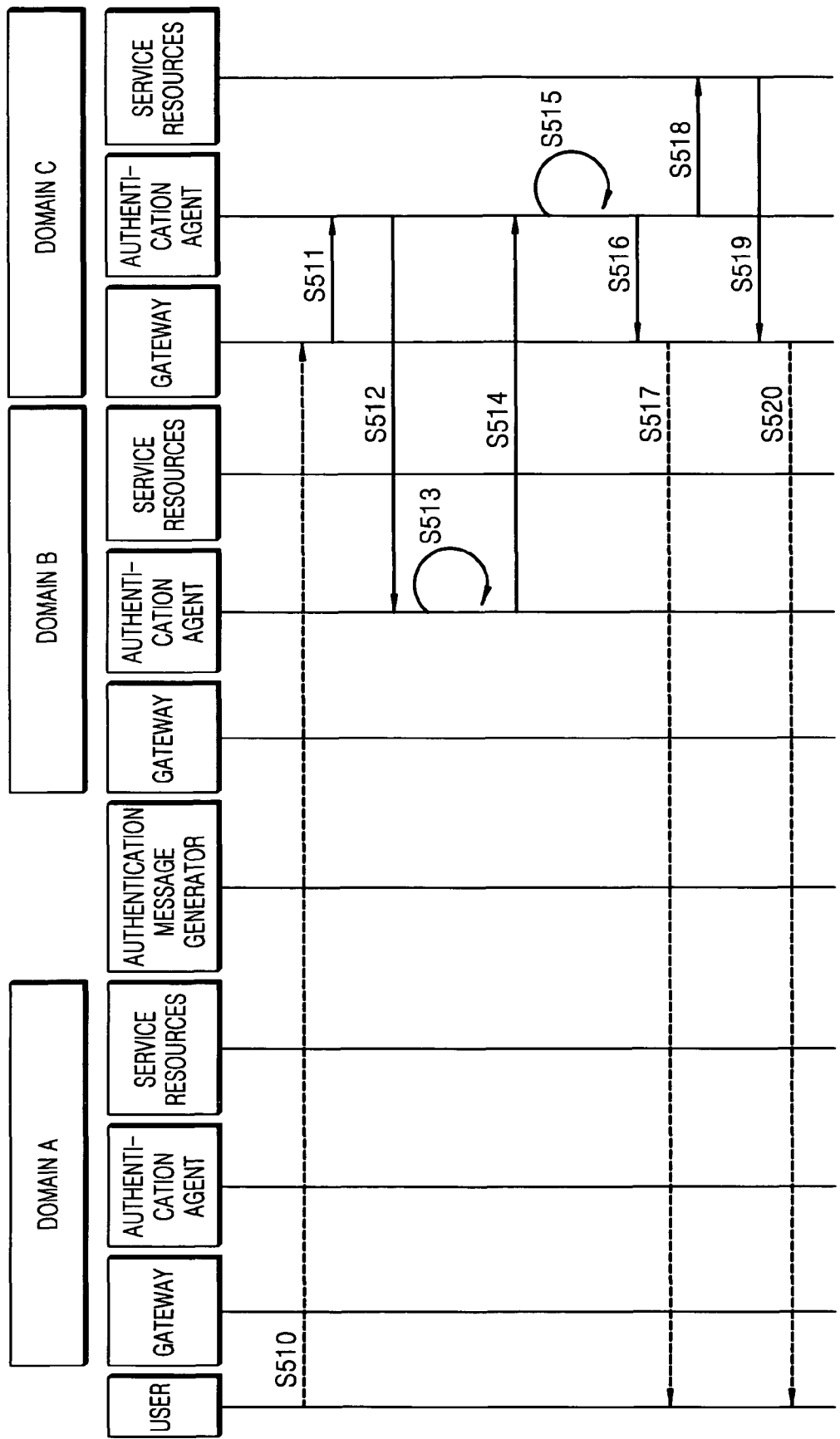

FIGS. 3 through 5 are sequence diagrams illustrating operations of a single-sign-on system according to a first exemplary embodiment of the present invention. In the drawings, the dotted lines denote data transmission in a wireless section, and the solid lines denote data transmission in a wired section.

FIG. 3 illustrates a process in which a user accesses a domain A and uses service resources of the domain A, FIG. 4 illustrates a process in which the user authenticated by the domain A accesses a domain B and uses service resources of the domain B, and FIG. 5 illustrates a process in which the user uses service resources of a domain C after using the service resources of the domains A and B.

Referring to FIG. 3, the user transmits information required for authentication to the domain A via the wireless Internet in order to access the service resources of the domain A in operation S310. For example, the information required for authentication can be a user name and a password. Also, the information required for authentication can be an identifier of a mobile device currently used by the user, for example, a telephone number or a medium access control (MAC) address of the mobile device. Besides, as described above, the information required for authentication can be a certificate of the user. The information required for authentication transmitted by the user is transmitted to a gateway via the wireless Internet. The gateway transforms the information required for authentication transmitted in a wireless Internet protocol to a wired Internet protocol and transmits the transformed information required for authentication to an authentication agent in operation S311. The authentication agent, which has received the information required for authentication, generates authentication domain location information, e.g., an SAML artifact, in operation S312. The authentication domain location information informs of a location of the domain (domain A), which is currently authenticating the user, and information required for processing a user authentication message. The authentication agent transmits the generated authentication domain location information to the user via the gateway in operations S313 and S314. In addition, the authentication agent transmits the information required for authentication to a reliable authentication message generator and requests for user authentication in operation S315. The authentication message generator authenticates the user in response to the user authentication request and generates an authentication message if the authentication is successfully finished in operation S316. The generated authentication message is transmitted to the authentication agent as a message having a markup language format, e.g., an XML format, in operation S317. The authentication agent, which has received the authentication message, analyzes the user authentication message and permits or rejects access of the user to service resources. The authentication agent requests for the service resources in operation S318. The service resources are provided by the domain A and provided to the user via the gateway in operations S319 and S320. Here, a portion of the temporal order of operations S310 through S320 can be changed. For example, the procedures between the authentication agent and the authentication message generator can be performed earlier than the procedures between the user and the authentication agent. In this case, the order in which the operations S312, S313, S314, S315, S316, and S317 are performed can be S315, S316, S317, S312, S313, and S314.

Figure 11:
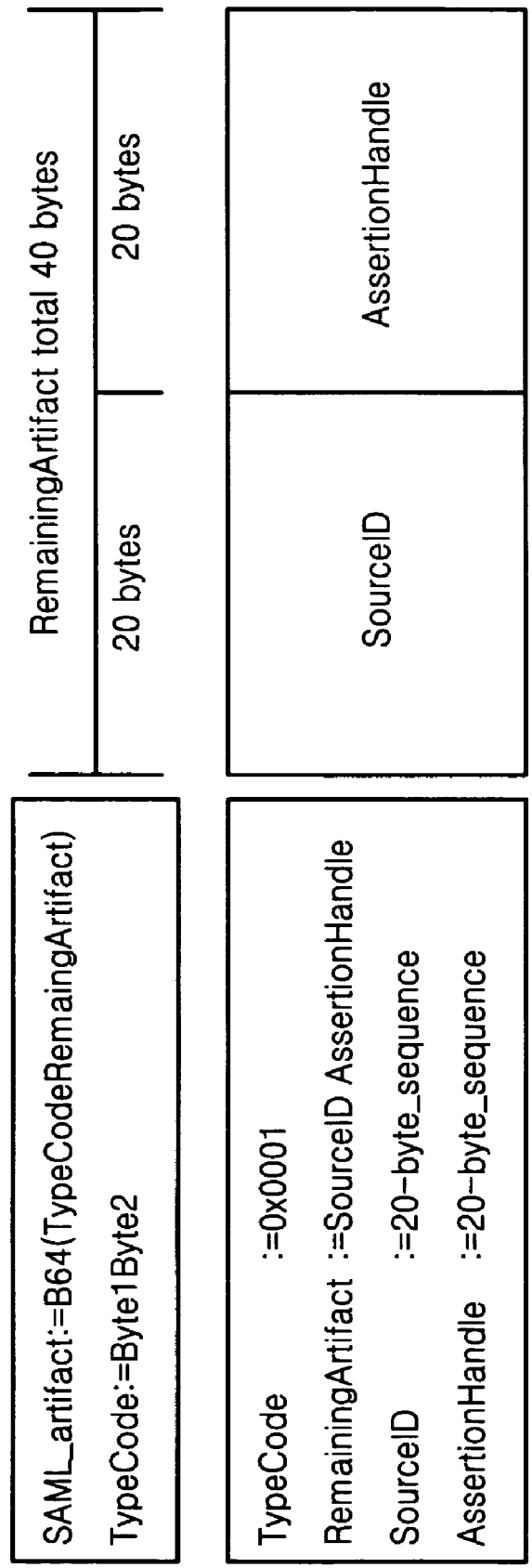
FIG. 11 illustrates an artifact including authentication domain location information and information required for processing a user authentication message according to an exemplary embodiment of the present invention.

The SAML artifact can be used as an exemplary embodiment of the authentication domain location information, and a structure of the SAML artifact will be described later with reference to FIG. 11.

Referring to FIG. 4, the user transmits the authentication domain location information to the domain B via the wireless Internet in order to access the service resources of the domain B in operation S410. Since the authentication domain location information is automatically transmitted, the user does not have to separately input the information required for authentication, e.g., the user name and password, to obtain an access right to the domain B. A gateway transforms the authentication domain location information transmitted in the wireless Internet protocol to the wired Internet protocol and transmits the transformed authentication domain location information to an authentication agent of the domain B in operation S411. The authentication agent of the domain B, which has received the authentication domain location information, requests the domain A for the user authentication information using the authentication domain location information in operation S412. The authentication agent of the domain A determines the integrity of the authentication domain location information transmitted from the authentication agent of the domain B with the authentication information request together in operation S413. If the authentication domain location information is neither counterfeited nor altered, the authentication information request is valid, and thus the authentication agent of the domain A transmits an authentication message to the domain B and deletes the stored authentication message and authentication domain location information in operation S414. The authentication agent of the domain B, which has received the authentication message, generates new authentication domain location information and information required for processing a user authentication message in operation S415. The newly generated authentication domain location information includes information on a location of the domain B and information required for processing the user authentication message. The newly generated authentication domain location information is transmitted to the user via the gateway in operations S416 and S417. Then, the authentication agent of the domain B analyzes the user authentication message and requests for service resources in operation S418. The service resources, which are provided by the domain B, are provided to the user via the gateway in operations S419 and S420. Like FIG. 3, a portion of the temporal order of operations S410 through S420 can be changed. For example, the procedures in which the authentication agent of the domain B generates the new authentication domain location information and transmits it to the user can be performed earlier than the procedures between the authentication agent of the domain B and the authentication agent of the domain A. In this case, the order in which the operations S412, S413, S414, S415, S416, and S417 are performed can be S415, S416, S417, S412, S413, and S414.

Referring to FIG. 5, the user transmits the authentication domain location information to the domain C via the wireless Internet in order to access the service resources of the domain C in operation S510. Since the authentication domain location information is automatically transmitted, the user does not have to separately input the information required for authentication, e.g., the user name and password, to obtain an access right to the domain C. A gateway transforms the authentication domain location information transmitted in the wireless Internet protocol to the wired Internet protocol and transmits the transformed authentication domain location information to an authentication agent of the domain C in operation S511. The authentication agent of the domain C, which has received the authentication domain location information, requests the domain B for the user authentication information using the authentication domain location information in operation S512. The authentication agent of the domain B determines the integrity of the authentication domain location information transmitted from the authentication agent of the domain C with the authentication information request together in operation S513. If the authentication domain location information is neither counterfeited nor altered, the authentication information request is valid, and thus the authentication agent of the domain B transmits an authentication message to the domain C and deletes the stored authentication message and authentication domain location information in operation S514. The authentication agent of the domain C, which has received the authentication message, generates new authentication domain location information and information required for processing a user authentication message in operation S515. The newly generated authentication domain location information includes information on a location of the domain C and information required for processing the user authentication message. The newly generated authentication domain location information is transmitted to the user via the gateway in operations S516 and S517. Then, the authentication agent of the domain C analyzes the user authentication message and requests for service resources in operation S518. The service resources, which are provided by the domain C, are provided to the user via the gateway in operations S519 and S520. Like FIGS. 3 and 4, a portion of the temporal order of operations S410 through S420 can be changed. For example, the procedures in which the authentication agent of the domain C generates the new authentication domain location information and the information required for processing the user authentication message and transmits them to the user can be performed earlier than the procedures between the authentication agent of the domain C and the authentication agent of the domain B. In this case, the order in which the operations S512, S513, S514, S515, S516, and S517 are performed can be S515, S516, S517, S512, S513, and S514.

Figure 6:
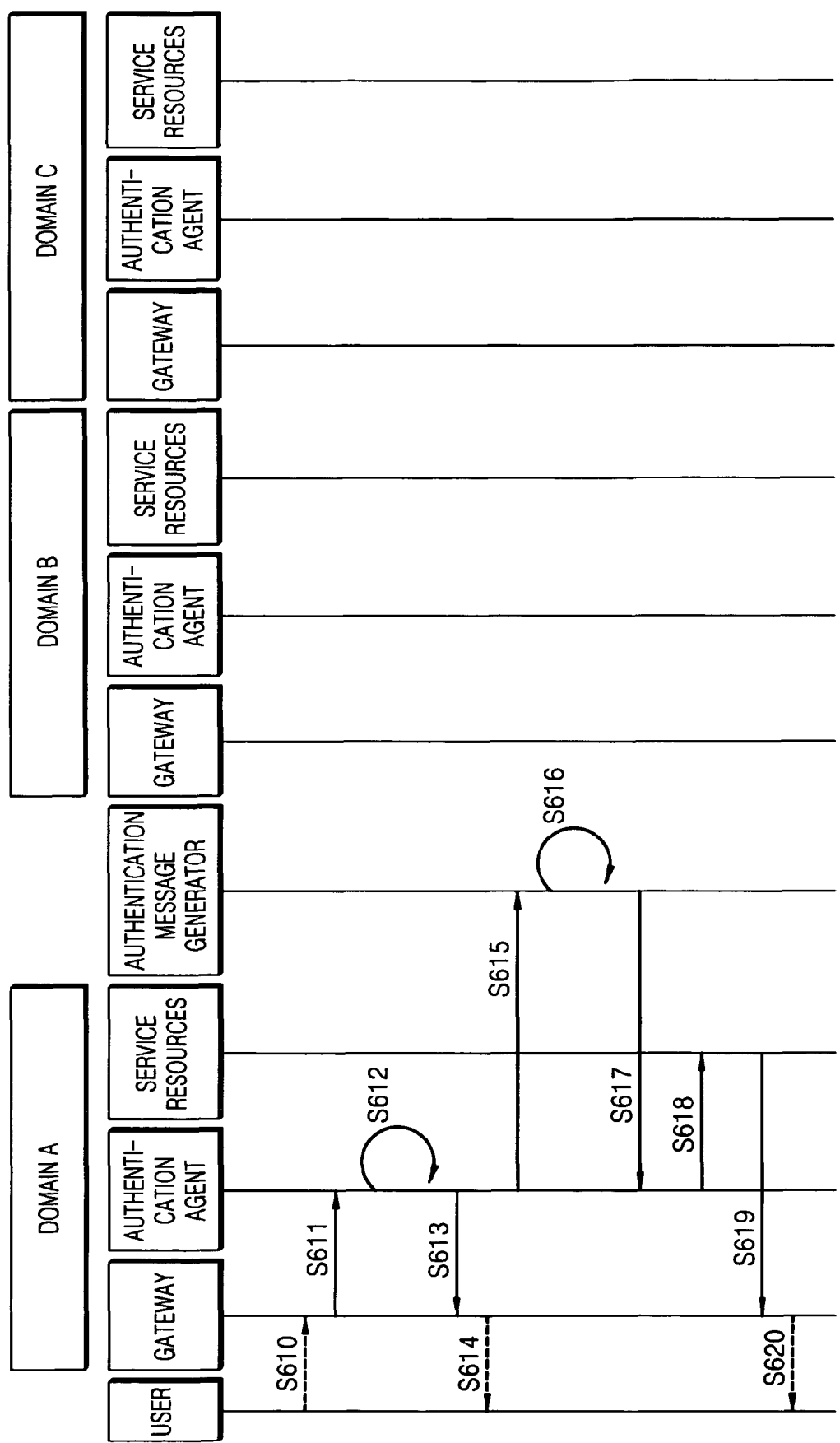
FIGS. 6 through 8 are sequence diagrams illustrating operations of a single-sign-on system according to a second exemplary embodiment of the present invention.
Figure 7:
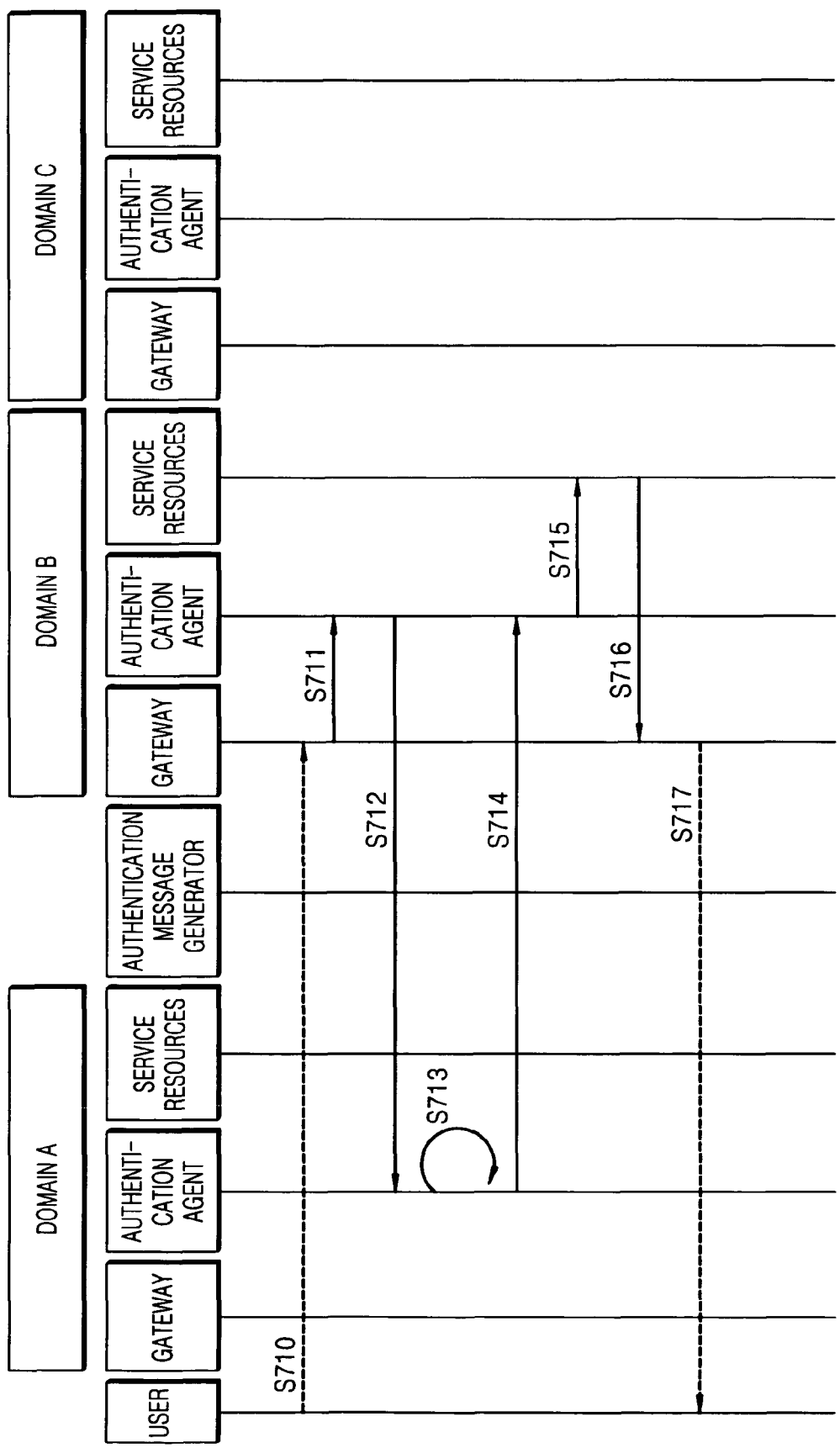
Figure 8:
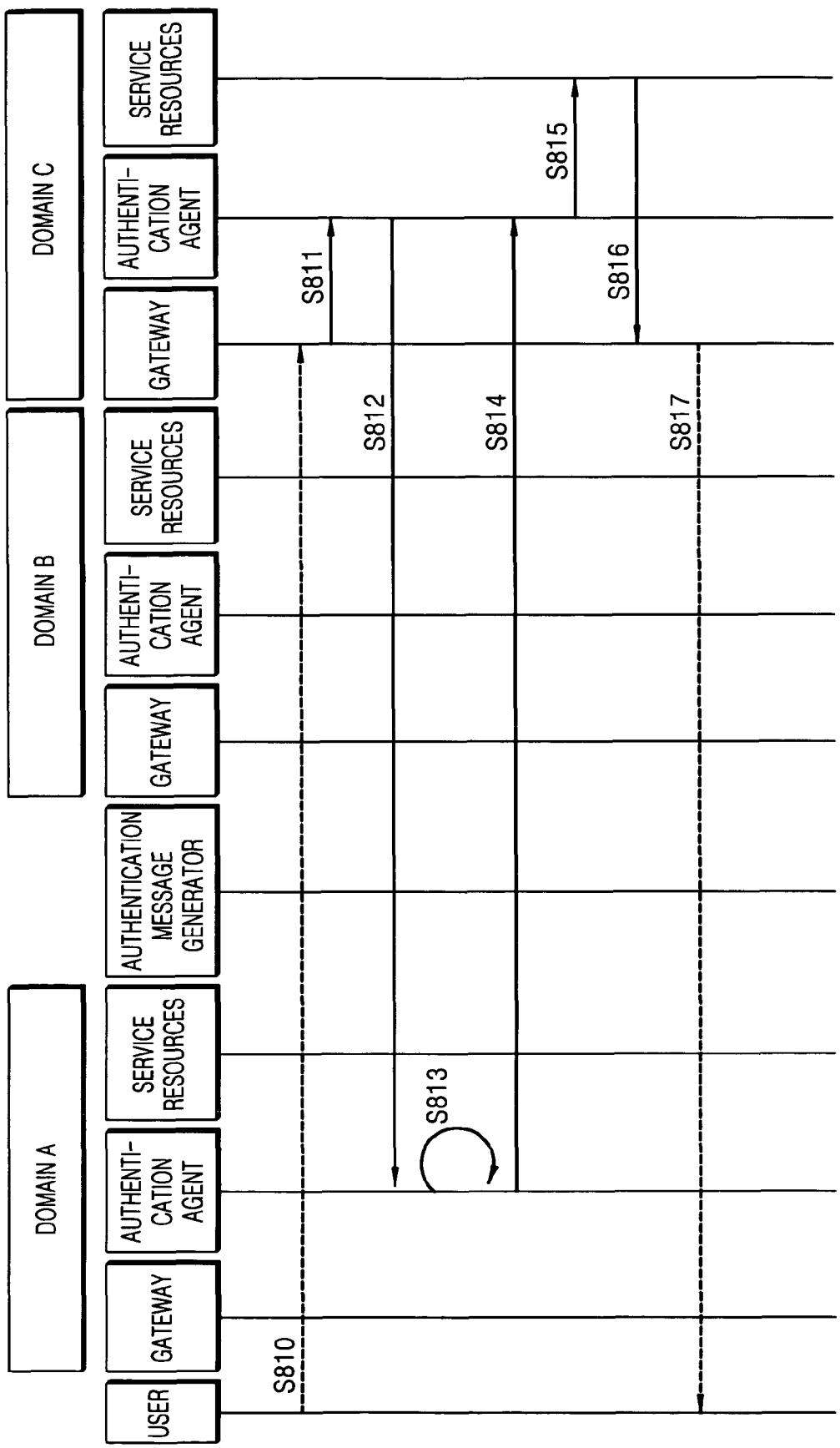

FIGS. 6 through 8 are sequence diagrams illustrating operations of a single-sign-on system according to a second exemplary embodiment of the present invention.

FIG. 6 illustrates a process in which a user accesses a domain A and uses service resources of the domain A, FIG. 7 illustrates a process in which the user authenticated by the domain A accesses a domain B and uses service resources of the domain B, and FIG. 8 illustrates a process in which the user uses service resources of a domain C after using the service resources of the domains A and B.

Referring to FIG. 6, the user transmits information required for authentication to the domain A via the wireless Internet in order to access the service resources of the domain A in operation S610. For example, the information required for authentication can be a user name and a password. Also, the information required for authentication can be an identifier of a mobile device currently used by the user, for example, a telephone number or an MAC address of the mobile device. The information required for authentication transmitted by the user is transmitted to a gateway via the wireless Internet. The gateway transforms the information required for authentication transmitted in a wireless Internet protocol to a wired Internet protocol and transmits the transformed information required for authentication to an authentication agent in operation S611. The authentication agent, which has received the information required for authentication, generates authentication domain location information in operation S612. The authentication domain location information informs of a location of the domain (domain A), which is currently authenticating the user, and information required for processing a user authentication message. The authentication agent transmits the generated authentication domain location information to the user via the gateway in operations S613 and S614. In addition, the authentication agent transmits the information required for authentication to a reliable authentication message generator and requests for user authentication in operation S615. The authentication message generator authenticates the user in response to the user authentication request and generates an authentication message if the authentication is successfully finished in operation S616. The generated authentication message is transmitted to the authentication agent as a message having a markup language format, e.g., an XML format, in operation S617. The authentication agent, which has received the authentication message, analyzes the user authentication message and permits or rejects access of the user to service resources. The authentication agent requests for the service resources in operation S618. The service resources are provided by the domain A and provided to the user via the gateway in operations S619 and S620. Here, a portion of the temporal order of operations S610 through S620 can be changed. For example, the procedures between the authentication agent and the authentication message generator can be performed earlier than the procedures between the user and the authentication agent. In this case, the order in which the operations S612, S613, S614, S615, S616, and S617 are performed can be S615, S616, S617, S612, S613, and S614.

Referring to FIG. 7, the user transmits the authentication domain location information to the domain B via the wireless Internet in order to access the service resources of the domain B in operation S710. Since the authentication domain location information is automatically transmitted, the user does not have to separately input the information required for authentication, e.g., the user name and password, to obtain an access right to the domain B. A gateway transforms the authentication domain location information transmitted in the wireless Internet protocol to the wired Internet protocol and transmits the transformed authentication domain location information to an authentication agent of the domain B in operation S711. The authentication agent of the domain B, which has received the authentication domain location information, requests the domain A for the user authentication information using the authentication domain location information in operation S712. The authentication agent of the domain A determines integrity of the authentication domain location information transmitted from the authentication agent of the domain B with the authentication information request together in operation S713. If the authentication domain location information is neither counterfeited nor altered, the authentication information request is reasonable, and thus the authentication agent of the domain A transmits to the domain B an authentication notice message informing that the user is normally authenticated by the domain A in operation S714. Unlike FIG. 4, the domain A neither directly transmits its possessing authentication message to the domain B nor deletes the authentication message stored therein. In addition, unlike FIG. 4, the domain B does not generate new authentication domain location information. The authentication agent of the domain B, which has received the authentication notice message, requests service resources in operation S715. The service resources, which are provided by the domain B, are provided to the user via the gateway in operations S716 and S717.

Referring to FIG. 8, the user transmits the authentication domain location information to the domain C via the wireless Internet in order to access the service resources of the domain C in operation S810. Since the authentication domain location information is automatically transmitted, the user does not have to separately input the information required for authentication, e.g., the user name and password, to obtain an access right to the domain C. Unlike FIG. 6, the authentication domain location information includes the location information of the domain A and the information required for processing the user authentication message. A gateway transforms the authentication domain location information transmitted in the wireless Internet protocol to the wired Internet protocol and transmits the transformed authentication domain location information to an authentication agent of the domain C in operation S811. The authentication agent of the domain C, which has received the authentication domain location information, requests the user authentication information from the domain A by using the authentication domain location information in operation S812. The authentication agent of the domain A determines the integrity of the authentication domain location information transmitted from the authentication agent of the domain C with the authentication information request together in operation S813. If the authentication domain location information is neither counterfeited nor altered, the authentication information request is valid, and thus the authentication agent of the domain A transmits to the domain C an authentication notice message informing that the user is normally authenticated by the domain A in operation S814. Unlike FIG. 5, the domain A neither directly transmits its possessing authentication message to the domain C nor deletes the authentication message stored therein. In addition, unlike FIG. 5, the domain C does not generate new authentication domain location information. The authentication agent of the domain C, which has received the authentication notice message, analyzes the authentication notice message and requests service resources in operation S815. The service resources, which are provided by the domain C, are provided to the user via the gateway in operations S816 and S817.

The exemplary embodiments described above realize a single-sign-on system based on a markup language. The use of markup languages, such as standard generalized markup language (SGML), hypertext markup language (HTML), and XML, is increasing due to convenient transmission of structural information. Recently, the most popular markup language is the XML, which is a standard of the World Wide Web Consortium (W3C). It is predicted that various markup languages will be being developed and used. In particular, unlike the HTML, the XML has expandability. Thus the XML is getting applied to a lot of applications.

Upon realizing a single-sign-on system based on a markup language, the exemplary embodiments of the present invention can accommodate various conventional authentication methods. In particular, the SAML, which is a subset of the XML and a standard completed by the Organization for the Advancement of Structured Information Standards (OASIS), aims at an exchange of authentication and authority information between domains. Recently, user authentication tools supported by the SAML are password, Kerberos, secure remote password (SRP), hardware token, SSL/TLS Certificate Based Client Authentication, and X.509 public key.

The SAML will now be described in more detail.

The SAML is designed to provide a single-sign-on method for an automatic and manual interoperation between systems. The SAML allows a user to login into another domain and defines all rights of the user. In addition, the SAML manages an automatic message exchange between two domains. The SAML is a set of specifications defining its own components as follows.

Assertions and request/response protocols
Bindings
Profiles
Security considerations while using SAML
Conformance guidelines and a test suite
Use cases and requirements The SAML enables an exchange of authentication and authority information related to an entity for proving identity, which is called a user, a device, or a subject. To do this, The SAML defines a request-response protocol using a subset of the XML. A system permits or rejects subjects based on assertions using this protocol.

Here, the assertion is declaration of a fact with respect to a subject. The SAML defines three assertion types.

Authentication
This indicates that a subject has been authenticated by a method such as a password, hardware token, or X.509 public key method.

Authorization
This indicates that access of a subject to resources should be permitted or rejected.

Attribution
This indicates that a subject is related to attributes.

FIG. 9 illustrates an assertion schema in the SAML. FIG. 10 is an example of an assertion text including an authentication assertion generated by an SAML authentication message generator. The authentication authority described in FIGS. 1 and 3 through 8 corresponds to the SAML authentication message generator, and the authentication message generated by the authentication message generator described in FIGS. 3 through 8 corresponds to the authentication assertion.

The SAML defines an artifact mechanism, which will be described with reference to FIG. 11.

In an SAML architecture, artifacts can be used for searching for an assertion by servers. For example, the authentication domain location information described in FIGS. 3 through 8 corresponds to artifacts, and the authentication agents of the respective domains can search for a location of a domain having an authentication assertion using the artifacts. In the SAML, an artifact is constituted by a type-code having a 20-byte length and an assertion handler (AssertionHandle) having a 20-byte length. That is, the artifact has a total 40-byte length. The type-code and assertion handler indicates a source identifier (SourceID) form which the artifact is generated and a random number, respectively.

The source identifier is used for a destination site to determine an identity and a location of a source site. For example, In FIG. 3, the source site corresponds to the domain A, and the destination site corresponds to the domain B. The destination site maintains not only a URL (or address) of a correspondent SAML response site but also a table of source identifier values. This information is transferred between the source and destination sites. As soon as receiving the SAML artifact, the destination site belong to a source site whose source identifier is known and determines whether to obtain a location of the site before transmitting an SAML request.

The SAML can be connected to various communication and transmission protocols, mainly to a simple object access protocol (SOAP). The SAML can operate in one of two profiles, i.e., Browser/artifact and Browser/post, without a cookie. If Browser/artifact is used, the SAML artifact is transmitted as a portion of a URL query string. Here, the artifact is a pointer with respect to an assertion.

The sequence will be described with reference to FIGS. 12 and 13.

Figure 12:
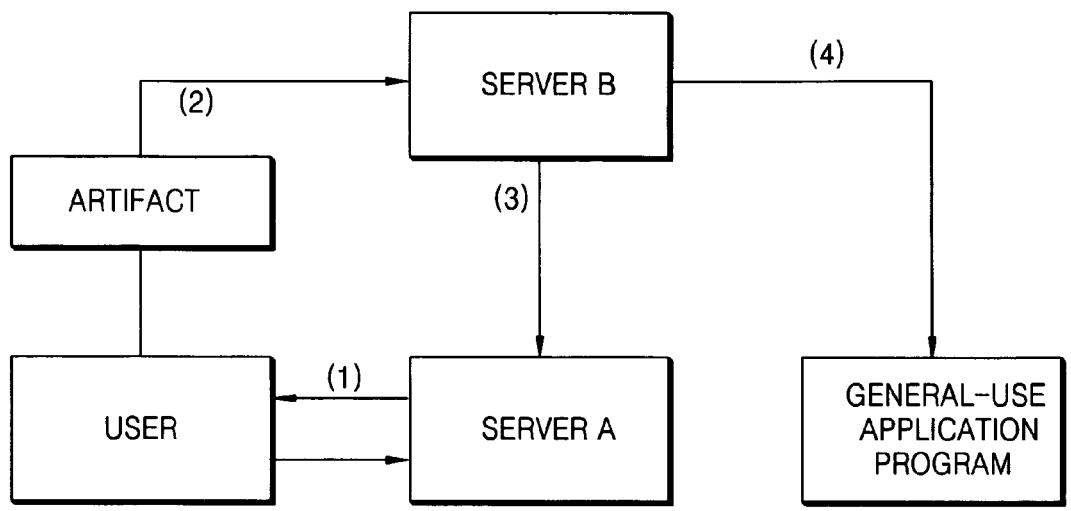
FIG. 12 illustrates a method of transmitting the authentication domain location information according to an exemplary embodiment of the present invention.

FIG. 12 illustrates a method of transmitting authentication domain location information according to an exemplary embodiment of the present invention.

(1) A user of a browser authenticated by a server A requests for access to a general-use application program of server B. The server A generates a server B oriented URL redirect including an SAML artifact.

(2) The browser redirects the user to the server B receiving the artifact indicating an assertion of the server A.

(3) The server B transmits the artifact to the server A and receives a perfect assertion.

(4) The server B analyzes the received assertion and determines whether to permit or reject the access request of the user for the general-use application program.

For Browser/post, an SAML assertion is uploaded to the browser inside an HTML form and transmitted to a destination site as a portion of an HTTP post payload.

Figure 13:
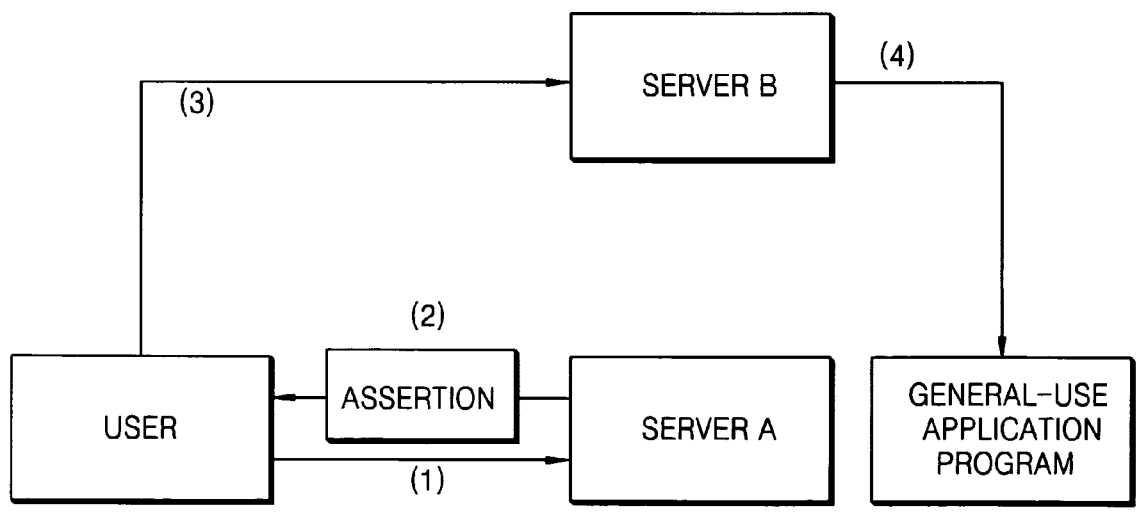
FIG. 13 illustrates a method of transmitting an assertion, which is a user authentication message, according to another exemplary embodiment of the present invention.

FIG. 13 illustrates a method of transmitting an assertion, which is a user authentication message, according to another exemplary embodiment of the present invention.

(1) A user of a browser authenticated by a server A requests for access to a general-use application program of server B.

(2) The server A generates an HTML form having an SAML assertion and returns it to the user.

(3) The browser transmits the form to the server B.

(4) The server B analyzes the received assertion and determines whether to permit or reject the access request of the user for the general-use application program.

The exemplary embodiments of the present invention realizing a single-sign-on method based on the SAML can be described as follows. The authentication domain location information generated in operation S312 of FIG. 3 corresponds to an artifact, and the authentication message generated in operation S316 of FIG. 3 corresponds to an authentication assertion. In operation S413 of FIG. 4, it is determined whether the artifact received from the domain B is altered or counterfeited by checking integrity by comparing the artifact generated in operation S312 of FIG. 3 to the artifact received from the domain B. The authentication message transmitted and deleted in operation S414 of FIG. 4 corresponds to an authentication assertion, and the new authentication domain location information generated in operation S415 of FIG. 4 corresponds to an artifact indicating the location of the domain B.

As described above, according to exemplary embodiments of the present invention, wired Internet resources can be used by a mobile device using a single-sign-on method.

Also, a single-sign-on method compatible with conventional single-sign-on methods can be provided using a markup language, in particular, an XML.

While this invention has been particularly shown and described with reference to exemplary embodiments thereof, it will be understood by those skilled in the art that various changes in form and details may be made therein without departing from the spirit and scope of the invention as defined by the appended claims. The above-described exemplary embodiments should be considered in a descriptive sense only and are not for purposes of limitation. Therefore, the scope of the invention is defined not by the detailed description of the invention but by the appended claims, and all differences within the scope will be construed as being included in the present invention.

What is claimed is:

1. A single-sign-on method based on a markup language, the method comprising:
    requesting, by an authentication agent server, user authentication by transmitting information required for authentication of a user using wireless Internet to an authentication message generator;
    generating authentication domain location information including location information of a current domain and information required for processing a user authentication message and transmitting the authentication domain location information to the user; and
    receiving, by the authentication agent server, the user authentication message, which has a markup language format, from the authentication message generator, and permitting or rejecting access of a mobile device of the user to resources based on the user authentication message,
    wherein the information required for processing the user authentication message includes a pointer indicating the user authentication message stored in the current domain, and
    wherein the authentication agent server is in the current domain and the authentication message generator is separate from the current domain.

2. The method of claim 1, wherein the wireless Internet protocol utilizes a wireless application protocol (WAP), and data is transmitted to or received from the user via a WAP gateway.

3. The method of claim 1, wherein the information required for authentication comprises a user name and a user password.

4. The method of claim 1, wherein the information required for authentication comprises a user certificate.

5. The method of claim 1, wherein the information required for authentication comprises a uniform resource locator (URL) indicating a location of a user certificate.

6. The method of claim 1, further comprising:
    transmitting the user authentication message to another domain if an authentication information request with respect to the user is received from the other domain.

7. The method of claim 6, further comprising:
    deleting the user authentication message and the authentication domain location information stored in the current domain if the user authentication message is transmitted to the other domain.

8. The method of claim 1, further comprising:
    transmitting to another domain an authentication notice message informing that the user is normally authenticated by the current domain if an authentication information request with respect to the user is received from the other domain.

9. A single-sign-on method based on a security assertion markup language (SAML), the method comprising:
    requesting, by an authentication agent server, user authentication by transmitting information required for authentication of a user using wireless Internet to an authentication message generator;
    generating an SAML artifact including location information of a current domain and information required for processing an SAML authentication assertion and transmitting the SAML artifact which is generated to the user; and
    receiving, by the authentication agent server, the SAML authentication assertion from the user authentication message generator, and permitting or rejecting access of a mobile device of the user to resources based on the SAML authentication assertion, wherein the information required for processing the SAML authentication assertion includes a pointer indicating the SAML authentication assertion stored in the current domain, and wherein the authentication agent server is in the current domain and the authentication message generator is separate from the current domain.

10. The method of claim 9, wherein the wireless Internet utilizes a wireless application protocol (WAP), and data is transmitted to or received from the user via a WAP gateway.

11. The method of claim 9, wherein the information required for authentication comprises a user name and a user password.

12. The method of claim 9, further comprising:
if the SAML artifact is received from another domain, transmitting the SAML authentication assertion to the other domain only if it determined that the SAML artifact is neither counterfeited nor altered as a result of checking an integrity of the received SAML artifact.

13. The method of claim 12, further comprising:
deleting the SAML authentication assertion and the SAML artifact stored in the current domain if the SAML authentication assertion is transmitted to the other domain.

14. A method of a single-sign-on based on a markup language, the method comprising:
a mobile device transmitting, to an authentication agent server in a first domain, information required for authentication in order to access service resources of the first domain providing a wired Internet service through wireless Internet;
the mobile device receiving authentication domain location information including location information of the first domain and information required for processing a user authentication message generated by an authentication message generator; and
the mobile device accessing service resources of the first domain,
wherein the information required for processing the user authentication message includes a pointer indicating the user authentication message stored in the first domain, and
wherein the authentication message generator is separate from the first domain.

15. The method of claim 14, wherein the wireless Internet utilizes a wireless application protocol (WAP), and data is transmitted to or received from the first domain via a WAP gateway.

16. The method of claim 14, wherein the information required for authentication comprises a user name and a user password.

17. The method of claim 14, further comprising:
transmitting the authentication domain location information to a second domain in order to access service resources of the second domain providing a wired Internet service through the wireless Internet and accessing the service resources of the second domain.

18. A single-sign-on method based on a security assertion markup language (SAML), the method comprising:
a mobile device transmitting, to an authentication agent server in a first domain, information required for authentication in order to access service resources of the first domain providing a wired Internet service through wireless Internet;
the mobile device receiving an SAML artifact including location information of the first domain and information required for processing an SAML authentication assertion generated by an authentication message generator; and
the mobile device accessing service resources of the first domain,
wherein the information required for processing the SAML authentication assertion includes a pointer indicating the SAML authentication assertion stored in the first domain, and
wherein the authentication message generator is separate from the first domain.

19. The method of claim 18, wherein the wireless Internet utilizes a wireless application protocol (WAP), and data is transmitted to or received from the first domain via a WAP gateway.

20. The method of claim 18, wherein the information required for authentication comprises a user name and a user password.

21. The method of claim 18, further comprising:
transmitting the SAML artifact to a second domain in order to access service resources of the second domain providing a wired Internet service through the wireless Internet and accessing the service resources of the second domain.

22. A single-sign-on method based on a markup language, the method comprising:
receiving authentication domain location information including location information of a first domain, which has authenticated a user using wireless Internet, and information required for processing a user authentication message generated by an authentication message generator;
requesting, by an authentication agent server in a second domain, authentication information of the user by transmitting the received authentication domain location information to the first domain, which has authenticated the user; and
receiving, by the authentication agent server in the second domain, the user authentication message which has a markup language format from the first domain, which has authenticated the user, and permitting or rejecting access of a mobile device of the user to resources based on the user authentication message,
wherein the information required for processing the user authentication message includes a pointer indicating the user authentication message stored in the first domain, which has authenticated the user, and
wherein the authentication message generator is separate from the first domain and the second domain.

23. The method of claim 22, wherein the wireless Internet utilizes a wireless application protocol (WAP), and data is transmitted to or received from the user via a WAP gateway.

24. The method of claim 22, further comprising:
generating authentication domain location information of a current domain including location information of the current domain and information required for processing the user authentication message stored in the current domain and transmitting the authentication domain location information to the user,
wherein the information required for processing the user authentication message stored in the current domain includes a pointer indicating the user authentication message stored in the current domain.

25. The method of claim 24, further comprising, if an authentication information request with respect to the user is received from another domain, transmitting the authentication message to the other domain.

26. The method of claim 25, further comprising, if the authentication message is transmitted to the other domain, deleting the authentication message and the authentication domain location information of the current domain stored in the current domain.

27. A single-sign-on method based on a security assertion markup language (SAML), the method comprising:
receiving an SAML artifact including location information of a first domain, which has authenticated a user using wireless Internet, and information required for an SAML authentication assertion generated by an authentication message generator;
requesting, by an authentication agent server in a second domain, authentication information of the user by transmitting the received SAML artifact to the first domain, which has authenticated the user; and
receiving, by the authentication agent server in the second domain, the SAML authentication assertion from the first domain, which has authenticated the user, and permitting or rejecting access of a mobile device of the user to resources based on the SAML authentication assertion,
wherein the information required for processing the SAML authentication assertion includes a pointer indicating the SAML authentication assertion stored in the first domain, which has authenticated the user, and
wherein the authentication message generator is separate from the first domain and the second domain.

28. The method of claim 27, wherein the wireless Internet utilizes a wireless application protocol (WAP), and data is transmitted to or received the user via a WAP gateway.

29. The method of claim 27, further comprising generating an SAML artifact of a current domain including location information of the current domain and information required for processing an SAML authentication assertion stored in the current domain and transmitting the SAML artifact of the current domain to the user,
wherein the information required for processing the SAML authentication assertion stored in the current domain includes a pointer indicating the SAML authentication assertion stored in the current domain.

30. The method of claim 29, further comprising if the SAML artifact of the current domain is received from another domain, transmitting the SAML authentication assertion to the other domain only if it is determined that the SAML artifact of the current domain is neither counterfeited nor altered as a result of checking an integrity of the SAML artifact of the current domain.

31. The method of claim 30, further comprising:
deleting the SAML authentication assertion and the SAML artifact of the current domain stored in the current domain if the SAML authentication assertion is transmitted to the other domain.

32. A single-sign-on system based on a markup language, the system comprising:
a plurality of domains which provide service resources to a mobile device of a user using wireless Internet through a gateway performing wired or wireless protocol transformation; and
an authentication message generator which receives information required for user authentication from an authentication agent server in a first domain of the plurality of domains, authenticates the user, generates an authentication message which has a markup language format, and transmits the authentication message to the authentication agent server in the first domain,
wherein the first domain, which has received the authentication message, permits or rejects access of the mobile device of the user to service resources based on the user authentication message, generates authentication domain location information including its own location information and information required for processing the user authentication message, transmits the generated authentication domain location information to the mobile device of the user, and transmits the authentication message to a second domain of the plurality of domains if a request for authentication information of the user is received from the second domain,
wherein the information required for processing the user authentication message includes a pointer indicating the user authentication message stored in the first domain, and
wherein the authentication message generator is separate from the first domain.

33. The system of claim 32, wherein after transmitting the authentication message to the second domain, the first domain deletes the authentication message and the authentication domain location information stored therein.

34. The system of claim 32, wherein the information required for user authentication comprises a user name and a user password.

35. The system of claim 32, wherein the gateway is a wireless application protocol (WAP) gateway using a WAP protocol.

36. The system of claim 32, wherein after receiving the authentication message, the second domain generates authentication domain location information of the second domain including its own location information and information required for processing the user authentication message stored in the second domain and transmits the authentication domain location information of the second domain to the user,
wherein the information required for processing the user authentication message stored in the second domain includes a pointer indicating the user authentication message stored in the second domain.

37. A single-sign-on system based on a security assertion markup language (SAML), the system comprising:
a plurality of domains which provide service resources to a mobile device of a user using wireless Internet through a gateway performing wired or wireless protocol transformation; and
an authentication message generator which receives information required for user authentication from an authentication agent server in a first domain of the plurality of domains, authenticates the user, generates an SAML authentication assertion, and transmits the SAML authentication assertion to the authentication agent server in the first domain,
wherein the first domain, which has received the SAML authentication assertion, permits or rejects access of the mobile device of the user to service resources based on the SAML authentication assertion, generates an SAML artifact including its own location information and information required for processing the SAML authentication assertion, transmits the SAML artifact to the mobile device of the user, and if a request for the user authentication is received from a second domain using the SAML artifact, transmits the SAML authentication assertion to the second domain of the plurality of domains only if it determined that the SAML artifact is neither counterfeited nor altered as a result of checking an integrity of the SAML artifact, wherein the information required for processing the SAML authentication assertion includes a pointer indicating the SAML authentication assertion stored in the first domain, and wherein the authentication message generator is separate from the first domain.

38. The system of claim 37, wherein after transmitting the SAML authentication assertion to the second domain, the first domain deletes the SAML authentication assertion and the SAML artifact stored therein.

39. The system of claim 37, wherein the information required for user authentication comprises a user name and a user password.

40. The system of claim 37, wherein the gateway is a wireless application protocol (WAP) gateway using a WAP protocol.

41. The system of claim 37, wherein after transmitting the SAML authentication assertion, the second domain generates an SAML artifact of the second domain including its own location information and information required for processing the SAML authentication assertion stored in the second domain and transmits the SAML artifact of the second domain to the user.

42. A computer-readable recording medium having recorded thereon a computer-readable program for performing a single-sign-on method based on a markup language, the method comprising:

requesting, by an authentication agent server, user authentication by transmitting information required for authentication of a user using wireless Internet to an authentication message generator;

generating authentication domain location information including location information of a current domain and information required for processing a user authentication message and transmitting the authentication domain location information to the user; and receiving, by the authentication agent server, an authentication message which has a markup language format from the authentication message generator, and permitting or rejecting access of the user to resources based on the user authentication message, wherein the information required for processing the user authentication message includes a pointer indicating the user authentication message stored in the current domain, and wherein the authentication agent server is in the current domain and the authentication message generator is separate from the current domain.

* * * * *